US007216411B1

(12) United States Patent
Mayhugh

(10) Patent No.: US 7,216,411 B1
(45) Date of Patent: May 15, 2007

(54) METHOD FOR ENABLING A SINGLE TECHNICIAN TO INSTALL A WINDSHIELD INTO A VEHICLE

(76) Inventor: Kent R. Mayhugh, N58 W23983 Hastings Ct. Apt. 801, Sussex, WI (US) 53089

( * ) Notice: Subject to any disclaimer, the term of this patent is extended or adjusted under 35 U.S.C. 154(b) by 156 days.

(21) Appl. No.: 10/947,924

(22) Filed: Sep. 23, 2004

(51) Int. Cl.
*B23Q 3/00* (2006.01)
*B23Q 7/00* (2006.01)

(52) U.S. Cl. .......................................... 29/468; 29/559

(58) Field of Classification Search .................. 29/468, 29/466, 464, 428, 50, 56.6, 270, 281.1, 281.4, 29/281.5, 281.6, 743, DIG. 44, 456, 426.4, 29/426.6, 559; 269/31, 61, 909; 254/95
See application file for complete search history.

(56) References Cited

U.S. PATENT DOCUMENTS 3,020,017 A * 2/1962 Watson .................... 248/205.8
3,620,524 A * 11/1971 Czompi ...................... 269/31
4,453,303 A * 6/1984 Leddet .................... 29/407.05
4,670,974 A * 6/1987 Antoszewski et al. ........ 29/701
5,112,092 A * 5/1992 Pucci ......................... 293/128
6,101,702 A * 8/2000 Claycomb et al. ......... 29/426.4

OTHER PUBLICATIONS

C. R. Laurence Co., Inc., "CRL's 'Lit'l Buddy' Windshield Installation Hoist Simplifies Installation for Single Operators," Newsletter dated 2002, http://www.crlaurence.com/pressrelease/templatenewsletter.asp?id=161, (2 pages).

* cited by examiner

*Primary Examiner*—John C. Hong
(74) *Attorney, Agent, or Firm*—Donald J. Ersler

(57) ABSTRACT

A method for enabling a single technician to install a windshield into a vehicle includes a door glass anchor and a windshield glass anchor. The door glass anchor includes a door glass clamp and a pivot structure. The pivot structure includes a tube extension and a pivot rod. One end of the tube extension is attached to the door glass clamp and the pivot rod structure extends from the other end. The windshield glass anchor includes a windshield glass clamp and a pivot extension. The pivot extension includes an outer slide tube, an inner slide tube and a pivoting end. One end of the outer slide tube is attached to the door glass clamp. The inner slide tube is sized to be slidably received by an inner perimeter of the outer slide tube. The pivoting end is formed on one end of the inner slide tube to receive the pivot rod.

16 Claims, 3 Drawing Sheets

36 12 1 22 104 10 10 38 40 100 108 102 106

48
46
40
50
44
38
36
32

30
34
31
12
42
34
42

50
50
40
48
38
32
36

12
31
42
30
42

METHOD FOR ENABLING A SINGLE TECHNICIAN TO INSTALL A WINDSHIELD INTO A VEHICLE

BACKGROUND OF THE INVENTION

1. Field of the Invention

The present invention relates generally to installation of windshields in vehicles and more specifically to a single technician large windshield installation tool, which eliminates the need for a second technician to install a windshield on a vehicle.

2. Discussion of the Prior Art

It appears that the prior art does not disclose a tool, which allows a single technician to install a windshield in a vehicle. Two technicians are required to install a large windshield in a vehicle. A first technician lifts one end of the windshield and the second technician lifts the other end of the windshield for installation and both place the windshield on the vehicle. The advantage of a single technician installation is half the labor cost of a two technician installation.

Accordingly, there is a clearly felt need in the art for a single technician large windshield installation tool, which eliminates the need for a second technician to install a large windshield in a vehicle and allows a large windshield to be installed by a single technician in nearly the same amount of time as a two technician installation.

SUMMARY OF THE INVENTION

The present invention provides a single technician large windshield installation tool, which eliminates the need for a second technician to install a windshield on a vehicle. The single technician large windshield installation tool (windshield installation tool) includes a door glass anchor and a windshield glass anchor. The door glass anchor includes a door glass clamp and a pivot structure. The pivot structure preferably includes at least one door retention ear, a tube extension and a pivot rod. One end of the at least one door retention ear is attached to the door glass clamp and the other end is attached to the tube extension at substantially one end thereof. The pivot rod extends from the other end of the tube extension.

The windshield glass anchor includes a windshield glass clamp and a pivot extension. The pivot extension preferably includes at least one windshield retention ear, an outer slide tube, an inner slide tube and a pivoting end. One end of the at least one windshield retention ear is attached to the door glass clamp and the other end is attached to the outer slide tube at substantially one end thereof. The inner slide tube is sized to be slidably received by an inner perimeter of the outer slide tube. The pivoting end is formed on one end of the inner slide tube. A pivoting cavity is formed through the pivoting end to receive the pivot rod.

In use, the door glass anchor is preferably attached to a front driver's side door window, such that the pivoting rod is substantially vertical. The windshield glass anchor is attached to attached to a windshield. The pivoting end is placed over the pivoting rod and supported by the door glass anchor. A single technician then grasps an end of the windshield. The single technician extends the inner slide tube from the outer slide tube and walks around a front of the vehicle, until they are adjacent a front passenger side door window. The technician then lowers the windshield into a vehicle windshield cavity.

Accordingly, it is an object of the present invention to provide a windshield installation tool, which eliminates the need for a second technician to install a windshield in a vehicle.

Finally, it is another object of the present invention to provide a windshield installation tool, which allows a windshield to be installed by a single technician in nearly the same amount of time as a two technician installation.

These and additional objects, advantages, features and benefits of the present invention will become apparent from the following specification.

DETAILED DESCRIPTION OF THE PREFERRED EMBODIMENTS

Figure 1:
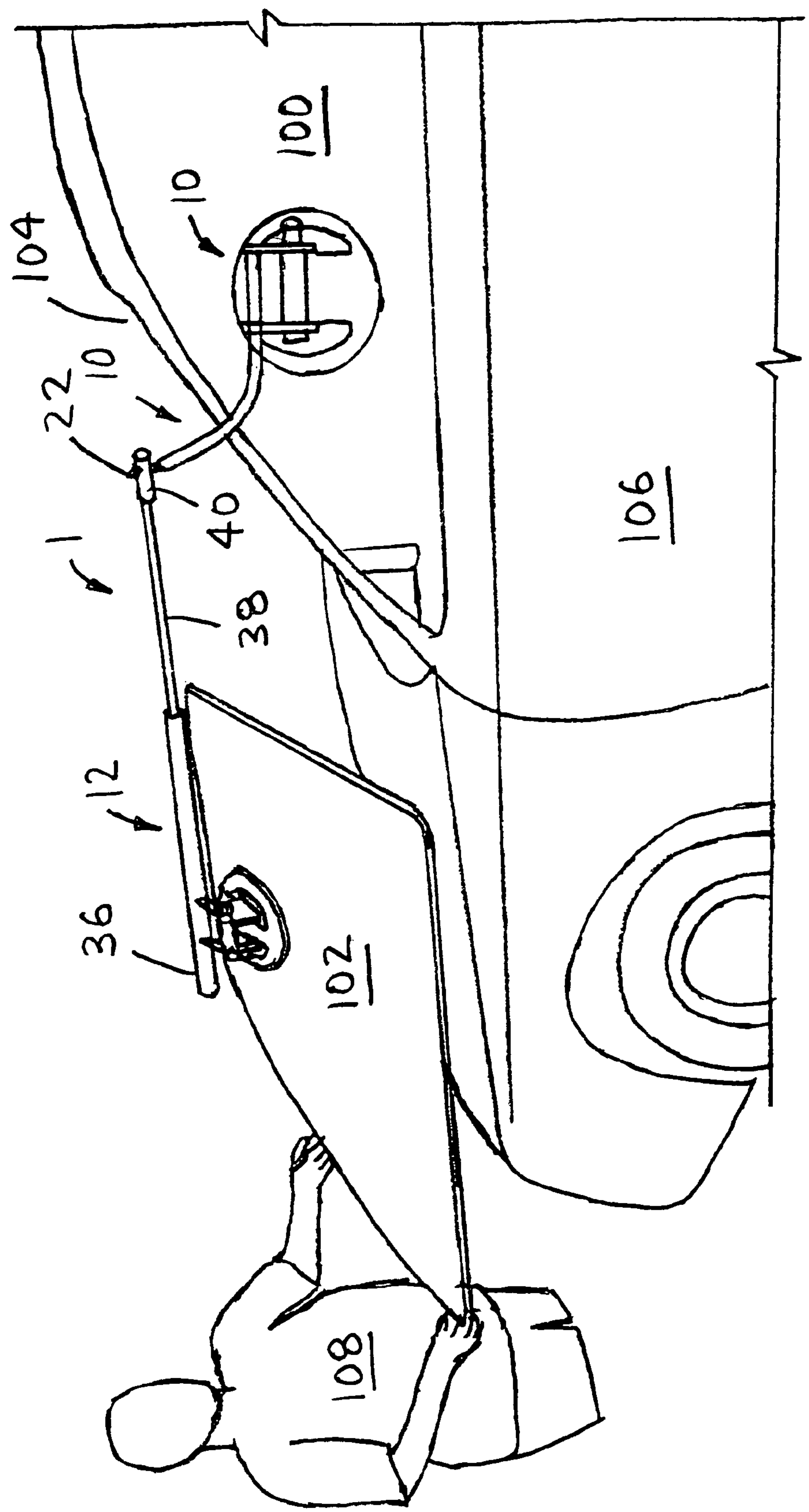
FIG. 1 is a perspective view of a windshield installation tool attached to a front driver's side door window and to a windshield in accordance with the present invention.
Figure 2:
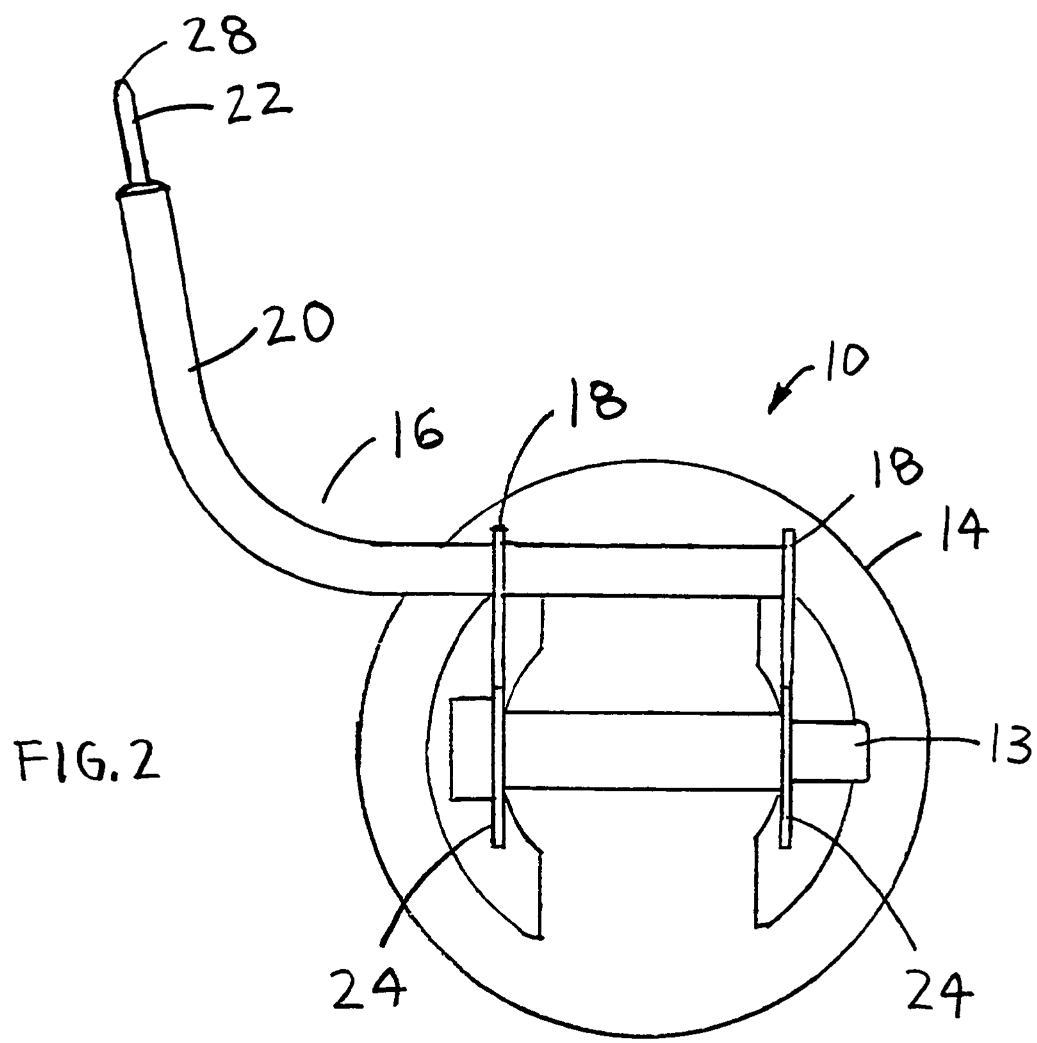
FIG. 2 is a front view of a door glass anchor of a windshield installation tool in accordance with the present invention.
Figure 3:
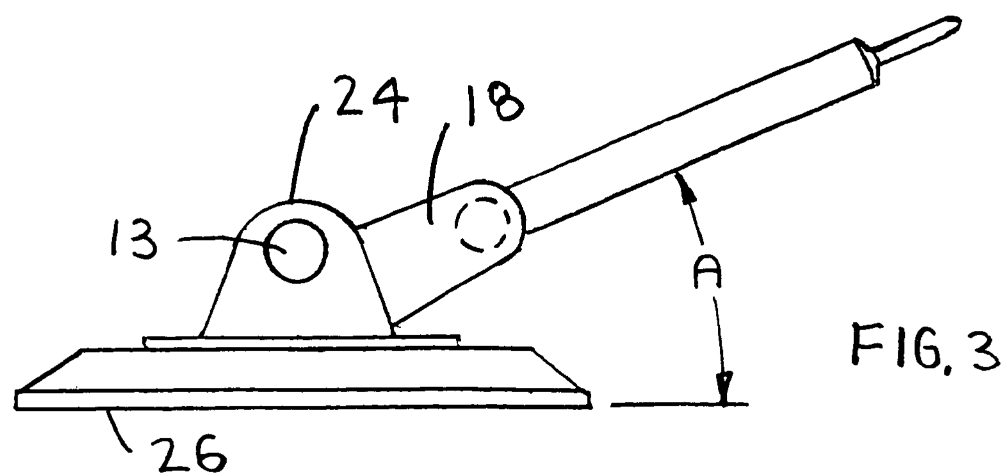
FIG. 3 is a side view of a door glass anchor of a windshield installation tool in accordance with the present invention.
Figure 4:
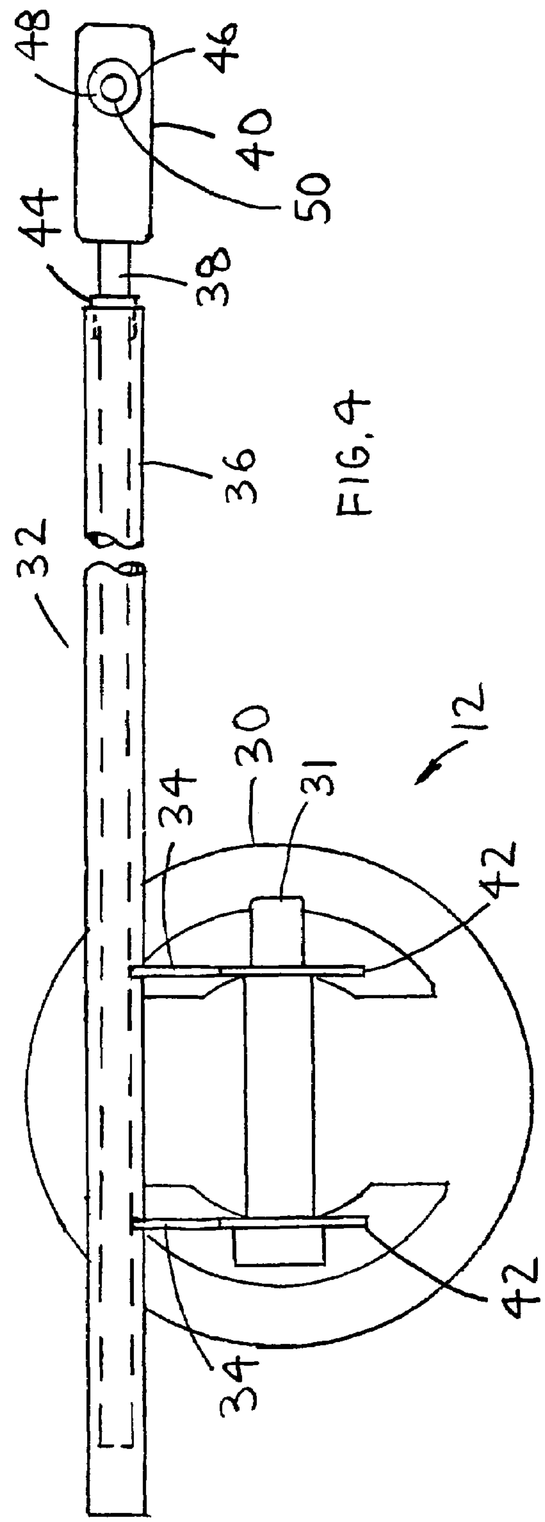
FIG. 4 is a front view of a windshield glass anchor of a windshield installation tool in accordance with the present invention.
Figure 5:
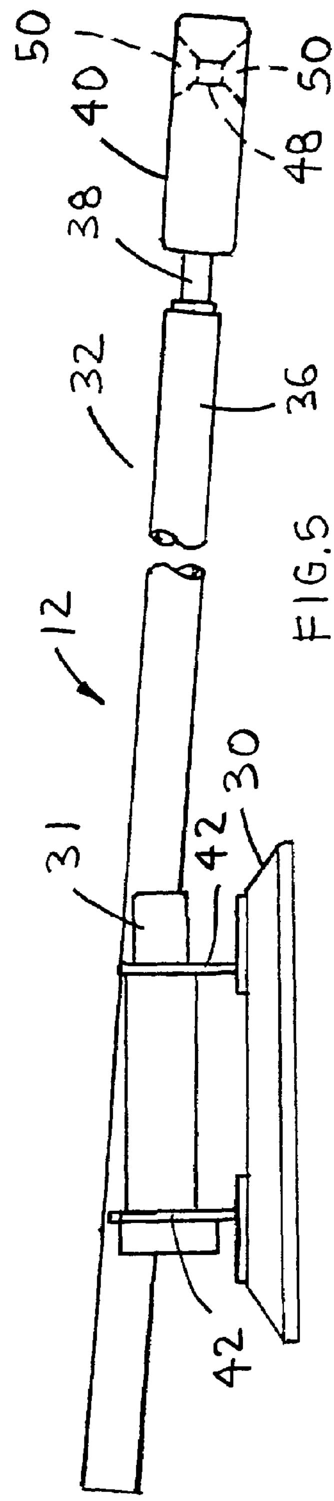
FIG. 5 is a side view of a windshield glass anchor of a windshield installation tool in accordance with the present invention.

With reference now to the drawings, and particularly to FIG. 1, there is shown a perspective view of a windshield installation tool 1. With reference to FIGS. 2–5, the windshield installation tool 1 includes a door glass anchor 10 and a windshield glass anchor 12. The door glass anchor 10 includes a door glass clamp 14 and a pivot structure 16. The door glass clamp 14 is preferably a N-series hand cup, manufactured by Wood's Powr-Grip Co., Inc. of Laurel, Mont., but other glass vacuum clamps may also be used. The pivot structure 16 preferably includes at least one door retention ear 18, a tube extension 20 and a pivot rod 22. One end of the at least one door retention ear 18 is preferably attached to a vacuum support member 24 of the door glass clamp 14 with welding or any other suitable method. The other end of the at least one door retention ear 18 is preferably attached to the tube extension 20 at substantially one end thereof with welding or any other suitable method. The tube extension 20 preferably has a substantial L-shape and is preferably positioned at an acute angle "A" relative to a bottom of a clamping portion 26 of the door glass clamp 14. However, the tube extension 20 may have a different shape, other than the substantial L-shape. The pivot rod 22 extends from the other end of the tube extension 20. A bullet end 28 is preferably formed on an end of the pivot rod 22.

The windshield glass anchor 12 includes a windshield glass clamp 30 and a pivot extension 32. The windshield glass clamp 30 is preferably a N-series hand cup, manufactured by Wood's Powr-Grip Co., Inc. of Laurel, Mont., but other glass vacuum clamps may also be used. The pivot extension 32 preferably includes at least one windshield retention ear 34, an outer slide tube 36, an inner slide tube 38 and a pivoting end 40. One end of the at least one windshield retention ear 34 is preferably attached to a vacuum support member 42 of the windshield glass clamp 30 with welding or any other suitable method. The other end of the at least one windshield retention ear 34 is preferably attached to the pivot extension 32 at substantially one end thereof with welding or any other suitable method.

The inner slide tube 38 is sized to be slidably received by a bushing 44 or the like retained in an inner perimeter of the outer slide tube 36. The pivoting end 40 is formed on one end of the inner slide tube 38. A pivot cavity 46 is formed through the pivoting end 40 to receive the pivot rod 22. The pivoting cavity 46 preferably includes a through hole 48 and an entrance countersink 50 formed on each end of the through hole 48. Each entrance countersink 50 facilitates the insertion of the pivot rod 22 into the through hole 48. One method of pivoting the windshield glass anchor to the door glass anchor has been shown, but other methods may also be used.

In use, the door glass anchor 10 is preferably attached to a front driver's side door window 100, such that the pivoting rod 22 is substantially vertical. The door glass anchor 10 could be modified to be attached to a front passenger's side door window. The door glass anchor 10 is attached by depressing a pump button 13, until the door glass anchor 10 is stationary. The windshield glass anchor 12 is attached to a top of a windshield 102 to be installed in a vehicle windshield cavity 104 of a vehicle 106. The windshield glass anchor 12 is attached by depressing a pump button 31, until the windshield glass anchor 12 is stationary. The pivoting end 40 is placed over the pivoting rod 22 and supported by the door glass anchor 10. A single technician 108 then grasps an end of the windshield 102. The single technician 108 extends the inner slide tube 38 from the outer slide tube 36 and walks around a front of the vehicle 106, until they are adjacent a front passenger side door window (not shown). The technician 108 then lowers the windshield 102 into the vehicle windshield cavity 104.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method for enabling a single technician to install a windshield into a vehicle, comprising the steps of:

attaching a door glass anchor to a side door window, said door glass anchor including at least one door glass clamp and a pivot structure; and attaching a windshield glass anchor to a windshield to be installed in a vehicle, said windshield glass anchor including a first member, a second member and at least one windshield glass clamp, one end of said first member being pivotally engaged with said pivot structure, an outer perimeter of said first member being captured by said second member, at least a portion of said outer perimeter of said first member sliding within said second member, said at least one windshield glass clamp extending from said second member.

2. A method for enabling a single technician to install a windshield into a vehicle of claim 1, comprising the steps of:

grasping one end of the windshield, pivoting said windshield around a front of said vehicle to an opposite side door, lowering the windshield into a vehicle windshield cavity of the vehicle.

3. The method for enabling a single technician to install a windshield into a vehicle of claim 2, further comprising the step of:

providing said pivot structure with a tube extension and a pivot rod, attaching one end of said tube extension to said at least one door glass clamp, extending said pivot rod from the other end of said tube extension.

4. The method for enabling a single technician to install a windshield into a vehicle of claim 3, further comprising the step of:

forming an opening through said one end of said first member to receive said pivot rod.

5. The method for enabling a single technician to install a windshield into a vehicle of claim 4, further comprising the step of:

making said first member rotatable relative to said second member.

6. A method for enabling a single technician to install a windshield into a vehicle, comprising the steps of:

attaching a door glass anchor to a side door window, said door glass anchor having at least one door glass clamp; and attaching a windshield glass anchor to a windshield to be installed in a vehicle, said windshield glass anchor having at least one windshield glass clamp, first member and a second member, said at least one windshield glass clamp extension from said second member, said first member having an outer perimeter, said outer perimeter being inserted into second member, said second member sliding along at least a portion of a length of said first member, engaging pivotally one end of said first member with said door glass anchor.

7. A method for enabling a single technician to install a windshield into a vehicle of claim 6, comprising the steps of:

grasping one end of the windshield, pivoting said windshield around a front of said vehicle to an opposite side door, lowering the windshield into a vehicle windshield cavity of the vehicle.

8. The method for enabling a single technician to install a windshield into a vehicle of claim 6, further comprising the step of:

providing said door glass anchor with a pivot structure, said one end of said first member being pivotally engaged with said pivot structure.

9. The method for enabling a single technician to install a windshield into a vehicle of claim 8, further comprising the step of:

forming an opening through said one end of said first member to receive said pivot structure.

10. The method for enabling a single technician to install a windshield into a vehicle of claim 6, further comprising the step of:

making said first member rotatable relative to said second member.

11. A method for enabling a single technician to install a windshield into a vehicle, comprising the steps of:

attaching a door glass anchor to a side door window, said door glass anchor having at least one door glass clamp; and attaching a windshield glass anchor to a windshield to be installed in a vehicle, said windshield glass anchor including a first member, a second member and at least one windshield glass clamp, said at least one windshield glass clamp extending from said second member, said first member having an extended length and an outer perimeter, inserting said first member into an inner perimeter in said second member, said windshield class anchor sliding along a portion of said extended length, engaging pivotally one end of said first member with said door glass anchor.

12. A method for enabling a single technician to install a windshield into a vehicle of claim 11, comprising the steps of:

grasping one end of the windshield, pivoting said windshield around a front of said vehicle to an opposite side door, lowering the windshield into a vehicle windshield cavity of the vehicle.

13. The method for enabling a single technician to install a windshield into a vehicle of claim 11, further comprising the step of:

providing said door glass anchor with a pivot structure, said one end of said first member being pivotally engaged with said pivot structure.

14. The method for enabling a single technician to install a windshield into a vehicle of claim 13, further comprising the step of:

providing said pivot structure with a tube extension and a pivot rod, attaching one end of said tube extension to said at least one door glass clamp, extending said pivot rod from the other end of said tube extension.

15. The method for enabling a single technician to install a windshield into a vehicle of claim 14, further comprising the step of:

forming an opening through said one end of said first member to receive said pivot rod.

16. The method for enabling a single technician to install a windshield into a vehicle of claim 11, further comprising the step of:

making said at least one windshield glass clamp rotatable relative to said one end of said windshield glass anchor.

* * * * *